United States Patent [19]

Kuznetsova et al.

[11] 4,120,831

[45] Oct. 17, 1978

[54] PROCESS FOR PRODUCING CARBOXYL CATIONITES

[76] Inventors: Nadezhda Nikolaevna Kuznetsova, Bolshoi prospekt, 11, kv. 7; Georgy Vasilievich Samsonov, 10 linia, 9, kv. 5; Klavdia Pavlovna Papukova, ulitsa Korablestroitelei, 19, korpus 1, kv.702; Galina Vladimirovna Bilibina, 7 linia, 2, kv. 33; Larisa Konstantinovna Shataeva, 3 Sovetskaya ulitsa, 9, kv. 22; Aida Alexandrovna Selezneva, prospekt Metallistov, 80, korpus 1, kv. 77; Nina Petrovna Kuznetsova, ulitsa Ostroumova, 7/9, kv. 13, all of Leningrad; Oyar Ansovich Vitols, ulitsa Lenina 11, kv. 40, Rizhsky raion, Olaine; Anite Ansovna Shtrausa, ulitsa Revoljutsii, 87, kv. 1, Riga; Lev Romanovich Gudkin, ulitsa Korablestroitelei, 23, korpus 1, kv. 279, Leningrad; Rimma Nikodimovna Mishaeva, naberezhnaya reki Karpovki, 13, kv. 27, Leningrad; Karina Moiseevna Rozhetskaya, ulitsa Podvopnika Kuzmina, 50, kv. 36, Leningrad, all of U.S.S.R.

[21] Appl. No.: 802,629

[22] Filed: Jun. 2, 1977

[51] Int. Cl.² .................... C08J 5/20; C08F 4/40; C08F 20/70
[52] U.S. Cl. ........................ 521/38; 526/194; 526/204; 526/261; 526/306; 526/915
[58] Field of Search ............ 260/2.2 R, 2.1 E; 526/194

[56] References Cited

U.S. PATENT DOCUMENTS

| 2,885,371 | 5/1959 | Tavani et al. | 526/194 |
| 2,963,453 | 12/1960 | Hwa et al. | 260/2.2 R |
| 3,037,052 | 5/1962 | Bortnick | 260/2.2 R |
| 3,988,305 | 10/1976 | Stoy et al. | 526/194 |

FOREIGN PATENT DOCUMENTS

| 4,539,549 | 12/1970 | Japan | 526/194 |

*Primary Examiner*—Herbert J. Lilling
*Attorney, Agent, or Firm*—Lackenbach, Lilling & Siegel

[57] ABSTRACT

A process for producing carboxyl cationites which comprises dissolution of comonomers such as methacrylic or acrylic acid and a vinyl-containing amide such as hexahydro-1,3,5-triacryloyltriazine, N, N'-methylenediacrylamide, N, N'-ethylenedimethacrylamide or N, N'-hexamethylenedimethacrylamide as well as an initiator of radical polymerization in a 5–50% acetic acid. Weight ratio between the unsaturated carboxylic acid and vinyl-containing amide is varied from 3:1 to 12:1; concentration of said comonomers in a 5–50% acetic acid is varied within the range of from 10 to 30%. The resulting reaction mixture is dispersed in polyethylsiloxane or polymethylphenylsiloxane liquid at a weight ratio between the reaction mixture and said silicone liquid ranging from 1:3 to 1:5 respectively. Thereafter, copolymerization is effected in a suspension at a temperature ranging from 20° to 100° C. The process according to the present invention makes it possible to obtain carboxyl cationites with reproducible properties and structure in the form of spherically-shaped granules possessing a high reversible sorption capacity with respect to proteins and enzymes in combination with high hydrodynamic properties.

5 Claims, No Drawings

PROCESS FOR PRODUCING CARBOXYL CATIONITES

The present invention relates to the production of synthetic ion-exchange resins and, more specifically, to processes for producing carboxyl cationites of the polymerization type.

Said cationites are useful in medical, microbiological and food industry as sorbents for biologically active compounds from naturally occurring sources, i.e. different sorts of microbiological raw materials, and physiological liquids.

Known in the art are sorption and chromatographic methods using ion-exchange pulps (celluloses) and macropore carboxyl cationites, mainly in combination with operations of salting-out proteins and enzymes or settling thereof with organic solvents.

However, ion-exchange pulps possess a low sorption capacity with respect to proteins and enzymes upon separation from the fermentation broth. As a rule, sorption capacity of ion-exchange pulps does not exceed 100 mg/g of the ionite, despite their large volume in the swollen state reaching 10–15 ml/g of the ionite. This in itself, as well as an irregular shape of particles brings about low hydrodynamic properties restricting the flow rate of a solution containing biologically active compounds in columns to 60 ml/hr.cm$^2$.

For this reason, sorption methods stipulating the use of ion-exchanging celluloses have not obtained wide commercial implementation and are emloyed mainly in laboratory practice.

Prior art macroporous carboxyl cationites employed for sorption of proteins and enzymes possess good hydrodynamic properties and a higher sorption capacity in respect to proteins and enzymes as compared to ion-exchange celluloses. However, said cationites substantially change their volume in swollen state when transformed from the hydrogen into hydrogen-sodium form which hinders the process of desorption of proteins and enzymes from the cationite in the case where the process of sorption-desorption is effected with different values of pH (the latter is the most widely employed embodiment upon separation of proteins and enzymes).

Known in the art is a process for producing carboxyl cationites in bulk, which involves dissolution of comonomers such as methacrylic acid and a vinyl-containing amide, i.e. hexahydro-1,3,5-triacryloyltriazine, or N,N'-methylenediacrylamide, or N,N'-ethylenedimethacrylamide or N,N'-hexamethylenedimethacrylamide, as well as a radical polymerization initiator in diluted acetic acid, followed by mass-copolymerization at a temperature within the range of from 20° to 100° C.

The carboxyl cationite based on methacrylic acid and hexahydro-1,3,5-triacryloyltriazine has large dimensions of pores in the swollen state in the hydrogen form, which is responsible for a high sorption capacity with respect to proteins and enzymes within the pH range of from 4 to 5, i.e. under the conditions of existence of native forms of proteins and enzymes. Therewith, the cationite is characterized by a small change of its volume in the swollen state under the conditions of desorption (when converting the cationite from the hydrogen to the hydrogen-sodium form, i.e. upon changing the pH value from 4 to 7). This makes it possible to obtain a higher yield of biologically active compounds upon desorption (90 to 100%). Therefore, the cationite features a high reversible sorption capacity.

The carboxyl cationites prepared by the above-described process from methacrylic acid and N,N'-alkylenedimethacrylamides do not possess the porosity value required for sorption of molecules of proteins and enzymes. These cationites are suitable only for sorption of organic compounds having a low molecular weight, such as, for example, antibiotics.

Said prior art process for producing carboxyl cationites based on methacrylic acid and hexahydro-1,3,5-triacryloyltriazino does not make it possible to obtain cationites with reproducible properties and structure, even upon the synthesis of the cationite in small amounts. This is due to the fact that copolymerization is accompanied by the auto-acceleration effect resulting in a sharp temperature increase in the reaction mass during the copolymerization. Furthermore, after disintegration of the resulting block of the copolymer, the cationite has the form of particles having irregular shape, which results in a rapid wear of the copolymer grains in the swollen state in sorption columns and causes a retarded flow rate of a solution containing biologically active substances.

Also known in the art is a process for producing a carboxyl cationite by copolymerization of methacrylic acid with hexahydro-1,3,5-triacryloyltriazine in a suspension in the presence of radical-polymerization initiators, wherein as the dispersing medium use is made of a saturated aqueous salt solution.

The resulting gel cationite produced by the above-described prior art process is suitable only for sorption of ions of inorganic compounds.

It is an object of the present invention to provide such a process which would make it possible to produce carboxyl cationites with reproducible properties and structures.

It is another object of the present invention to provide such a process which would make it possible to produce carboxyl cationites in the form of spherically-shaped granules possessing a high reversible sorption capacity in respect of proteins and enzymes in combination with high hydrodynamic properties.

These and other objects of the present invention are accomplished by a process for producing carboxyl cationites which involves dissolution of comonomers, i.e. an unsaturated carboxylic acid and a vinyl-containing amide as well as an initiator of radical polymerization in a 5–50% acetic acid. As the unsaturated carboxylic acids use is made of methacrylic or acrylic acid. As the vinyl-containing amides use is made of hexahydro-1,3,5-triacryloyltriazine, N,N'-methylenediacrylamide, N,N'-ethylenedimethacrylamide or N,N'-hexamethylenedimethacrylamide; the unsaturated carboxylic acid and vinyl-containing amide are taken in a weight ratio within the range of from 3:1 to 12:1 at a concentration of said comonomers in a 5–50% acetic acid equal to 10–30%. The resulting reaction mixture is dispersed in polyethylsiloxane or polymethylphenylsiloxane liquid at a weight ratio of said reaction mixture to said silicone liquid equal to 1:3 to 1:5 respectively, whereafter copolymerization is effected in suspension at a temperature within the range of from 20° to 100° C.

Owing to the copolymerization process conditions, it has become possible to produce carboxyl cationites with reproducible properties and structure in the form of spherically-shaped granules with a size of from 5 to 500 μ possessing high hydrodynamic properties enabling the performance of processes of separation and purification of proteins and enzymes from naturally occurring sources not only on laboratory and preparative scale but in commercial production. Flow rates of solutions containing biologically active substances passed through columns filled with a carboxy cationite in the hydrogen form in the swollen state are within the range of from 100 to 300 ml/hr.cm$^2$ depending on the conditions of the cationite preparation and the granule size. The resulting cationites feature a high sorption capacity and a substantially 100% yield of sorbed proteins and enzymes during desorption.

It is advisable that methacrylic or acrylic acid and the vinyl-containing amide be used in a weight ratio of 6-8:1 respectively.

In order to produce carboxyl cationites with maximal pore dimensions while retaining the necessary hydrodynamic properties, it is advisable to employ a 5 to 20% acetic acid at the concentration of comonomers in the latter equal to 20%. Furthermore, the use of acetic acid of a 5-20% concentration as a solvent for the starting comonomers makes it possible to produce carboxyl cationites possessing an insignificant change of volume in the swollen state (by 1.2-1.8 times) when transformed from the hydrogen form into the hydrogen-sodium form upon changing the pH value from 4 to 7, i.e. under the conditions of the sorption-desorption process.

To preclude possible migration of the comonomers from the solution of dilute acetic acid into the silicone liquid (dispersion medium) and to obtain granules with a size of from 100 to 500 $\mu$, it is advisable that the reaction mixture, prior to its dispersion, be subjected to pre-polymerization at a temperature of from 20° to 25° C.

Among the radical polymerization initiators it is advisable to employ a redox system such as ammonium persulphate — ascorbic acid, as the most effective system under the above-mentioned copolymerization process conditions.

The carboxyl cationites produced by the process according to the present invention comprise spherically-shaped granules with a size of from 5 to 500 $\mu$ in the air-dry state. Granules of the resulting cationite possess high porosity and a considerable internal interface surface area (up to 200 m$^2$/ml of the swollen cationite) in the swollen state in water, thus causing a high sorption capacity with respect to proteins and enzymes. At the same time, the resulting granules insignificantly change their swollen volume when transformed from the hydrogen form into the hydrogen-sodium form, which makes it possible to ensure a reversible sorption of proteins and enzymes within the pH range of from 4 to 7.

The resulting carboxyl cationites characterized by a high sorption capacity and a reversible sorption of biologically active substances have given the possibility of developing effective methods of separation and purification of the following proteins and enzymes:

(2) terrilitine from the fermentation broth *Aspergillus terricola* (sorption capacity is 200 mg of protein per gram of the cationite; sorption reversibility is 100%; effectiveness of purification is 16 times);

(2) neutral proteases of the fermentation broth *Bacillus subtiles* (sorption capacity is 300 mg of protein per gram of the cationonite; the yield as calculated for protcolytic activity is 100%; effectiveness of purification is 35 times);

(3) levansaccharose from the fermentation broth *Acetobacter suboxydans* (sorption capacity is 60 mg of protein per gram of the cationite; yield as calculated for activity is 100%; purification effectiveness is 20 times):

(4) immunoglobulines of the blood serum (sorption capacity is 20 mg of protein per gram of the cationonite; sorption reversibility 100%; as a result of the gradient elution process there is obtained separation of the immunoglobulines into fractions);

(5) toxines of cobra poison (sorption capacity is 260 mg of protein per gram of the cationite; sorption reversibility is 100%; as a result of the gradient elution process, separation of neuro- and cardio- toxines is possible);

(6) urokinase from human urea (sorption capacity is 200 to 300 mg of protein per gram of the cationite).

The process of separation and purification of proteins and enzymes using the cationite according to the present invention results in the preparation of highly-purified compounds, which makes it possible to avoid processes of additional purification such as, e.g. chromatographic separation.

High sorption capacity of the cationite according to the present invention makes it possible to concentrate proteins and enzymes during desorption by hundreds and thousands times as compared with their concentrations in naturally-occurring sources.

One of the advantages inherent in the carboxyl cationite produced by the process according to the present invention is that the carboxyl cationite in its hydrogen form is effectively employed for selective and reversible sorption of proteins and enzymes with different molecular weights from salt solutions. This distinctive feature of the cationite according to the present invention eliminates dialysis of the starting mixtures prior to the process of ion-exchange separation.

Structural particularity of the carboxyl cationite produced according to the present invention makes it possible to perform the process of separation of proteins and enzymes within a wide range of pH values of the eluting solution. Therewith, hydrodynamic properties of the carboxyl cationite ensure substantially any specific flow rate of elution of solutions through a column without the necessity of applying high pressures thereto, thus facilitating separation and purification of proteins and enzymes under the conditions of commercial-scale production.

The most preferable embodiment of the process for producing carboxyl cationites according to the present invention is effected in the following manner.

Methacrylic acid and hexahydro-1,3,5-triacryloyl-triazine are dissolved in a 15-20% acetic acid in the atmosphere of an inert gas and then added with an initiator of radical polymerization namely: ammonium persulphate-ascorbic acid. Concentration of the comonomers in the diluted acetic acid is 20%. The resulting reaction mixture is either at once dispersed in a polyethylsiloxane liquid or is first subjected to pre-polymerization at a temperature of from 20° to 25° C for a period of from 1 to 10 minutes to obtain a pre-polymer of the required viscosity, whereupon the resulting pre-polymer is dispersed in the polyethylsiloxane liquid. Then, copolymerization is conducted in suspension at a temperature of from 20° to 25° C under stirring for 5 hours to obtain granules insoluble in organic solvents and aqueous solutions of alkalis. Thereafter, the copolymer suspension is maintained at a temperature within the range of from 20° to 25° C for a period of from 10 to 15 hours without stirring, whereupon it is heated to a temperature of 80° C and maintained at this temperature an additional 60 minutes. Upon cooling to a temperature within the range of from 20° to 25° C, the cationite granules are separated from the polyethylsiloxane liquid and washed, in succession, with petroleum ether, acetone, water, a 0.5N aqueous solution of caustic soda, a 1N aqueous solution of hydrochloric acid, and water.

Carboxyl cationites are advantageous for use in separation and purification, from naturally-occurring sources, of proteins and enzymes containing no ions of metals under commercial production conditions, as well as for analytic and preparative purposes for operation with oligopeptides, proteins and enzymes.

For a better understanding of the present invention, some specific examples illustrating the production of carboxyl cationites are given hereinbelow.

EXAMPLE 1

Into a 1,000 ml flask provided with a stirrer, an inlet pipe for argon and a dropping funnel, there are poured 500 ml of polyethylsiloxane liquid and argon is bubbled for 30 minutes. At the same time, in a current of argon charged into the funnel are 16.8 ml of methacrylic acid, 2.06 g of hexahydro-1,3,5-triacryloyltriazine and 77 ml of a 20% solution of acetic acid. Obtained is a solution of the comonomers in diluted acetic acid (concentration of the comonomers in the solution is 20%). After dissolution of the comonomers, into the funnel an initiator is added i.e. 0.2889 g of ammonium persulphate and 0.2222 g of ascorbic acid, in a current of argon. The solution of the comonomers and the initiator in said 20% acetic acid (i.e. the reaction mixture) is maintained in the funnel at a temperature of 22° C for 5 minutes. On expiration of this time the resulting pre-polymer is poured, in the form of a thin stream, into polyethylsiloxane liquid under stirring (i.e. the pre-polymer is dispersed in said liquid). Thereafter, copolymerization is carried out in suspension at a temperature of 22° C under stirring (r.p.m. number of the stirrer is selected within the range of from 150 to 200) for 5 hours, whereafter the stirring is stopped and the copolymer suspension is maintained for an additional 10 hours at the same temperature. Further, the flask temperature is increased to 80° C and the copolymer suspension is maintained at this temperature and under stirring for one hour. After cooling to a temperature of 25° C the cationite granules are separated from the polyethylsiloxane liquid and washed successively with petroleum ether, acetone, water, a 0.5 N aqueous solution of caustic soda, a 1N solution of hydrochloric acid, and with water.

The yield of cationite in the air-dry state is 17.5 g (91%); predominant size of granules is 100-200μ. Exchange capacity with respect to sodium ion is 9.5 mg.-equiv./g. Swelling factor of the cationite in the H-form in water is 5.6. The swelling factor of the cationite in the H-form in a phosphate buffer (pH=6.8) is 8.4. Specific volume in the swollen state is 6.75 ml/g. Sorption capacity with respect to the proteolytic enzyme terrilitine (molecular weight of the enzyme is 28,000) is 200 mg of the protein per gram of the cationite. The yield of terrilitine upon desorption is 100%. Sorption capacity with respect to neutral proteases from the fermentation broth *Bacillus Subtiles* is 300 mg of protein per gram of the cationite. The yield of neutral proteases upon description is 100%.

EXAMPLE 2

Copolymerization is conducted under the conditions similar to those described in the foregoing Example 1, except that prepared is a solution of the comonomers in 20% acetic acid with the concentration of the comonomers in the latter of 15%. The yield of the cationite in the air-dry state is 90%. Swelling factor of the cationite in the H-form in water is 8.2. Swelling factor of the cationite in the H-form in a phosphate buffer (pH=6.8) is 10.8. Exchange capacity relative to sodium ion is 9.20 mg.-equiv./g. Specific volume in the swollen state is 11.9 ml/g. Sorption capacity relative to terrilitine is 250 mg of protein per gram of the cationite. The yield of terrilitine upon desorption is 90%.

EXAMPLE 3

Copolymerization is conducted under the same conditions as those described in the foregoing Example 1, except that produced is a solution of the comonomers in 20% acetic acid with the concentration of the comonomers in said acid of 25%. The cationite yield is 87%. Swelling factor of the cationite in the H-form in water is 4.8. Swelling factor in the H-form in a phosphate buffer (pH=6.8) is 6.8. Exchange capacity relative to sodium ion is 9.36mg.-equiv./g. Specific volume in the swollen state is 6.4 ml/g. Sorption capacity with respect to terrilitine is 175 mg of protein per gram of the cationite. The yield of terrilitine upon desorption is 95%.

EXAMPLE 4

Copolymerization is conducted under the same conditions as in Example 1 hereinbefore, except that prepared is a solution of the comonomers in a 20% acetic acid with the concentration of the comonomers in said acid equal to 30%. The copolymerization process is carried out at a temperature of 22° C for 5 hours under stirring, then at the same temperature without stirring for 10 hours, whereafter the temperature is elevated up to 100° C and the copolymerization process is performed at this temperature for 0.5 hour. The cationite yield is 93%. Swelling factor of the cationite in the H-form in water is 4.4. Swelling factor of the cationite in the H-form in a phosphate buffer (pH=6.8) is 4.5. Exchange capacity relative to sodium ion is 9.5 mg.-equiv./g. Specific volume in the swollen state is 7.7 ml/g. Sorption capacity with respect to urokinase is 3.6 × $10^3$ CTA/ml of the swollen cationite. The yield of urokinase upon desorption is 100%. Concentration of urokinase in the solution after desorption from the cationite is increased, as compared to its initial concentration in human urine, by 1,500 times. Specific activity relative to the compound is 10,600 streptokinase units per ml of protein. Sorption capacity with respect to neuraminidase is 6,000 PU/ml of the swollen cationite (PU is activity with respect to the substrate — ovomucine). The yield of neuraminidase upon desorption is 80%.

EXAMPLE 5

Copolymerization is conducted under the same conditions as in Example 1 hereinbefore, except that use is made of a 5% aqueous solution of acetic acid, 1.548 g of hexahydro-1,3,5-triacryloyltriazine. The cationite yield is 90%. Swelling factor of the cationite in the H-form in water is 6.9. Swelling factor of the cationite in the H-form in a phosphate buffer (pH=6.8), is 11.0. Exchange capacity with respect to sodium ion is 9.5 mg.-equiv./g. Specific volume in the swollen state is 8.5 ml/g. Sorption capacity with respect to terrilitine is 200 mg of protein per gram of the cationite. The yield of terrilitine upon desorption is 90%.

EXAMPLE 6

Copolymerization is conducted under the conditions similar to those described in the foregoing Example 1, except that use is made of a 50% aqueous solution of acetic acid at the weight ratio between methacrylic acid and hexahydro-1,3,5-triacryloyltriazine equal to 4:1. The reaction mixture, without keeping it in a dropping funnel, is directly fed into the polyethylsiloxane liquid. The cationite yield is 75%. Swelling factor of the cationite in the H-form in water is 4.5. Swelling factor of the cationite in the H-form in a phosphate buffer (pH=6.8) is 6.9. Specific volume of the swollen cationite is 6.0 ml/g. Exchange capacity with respect to sodium ion is 8.5 mg.-equiv./g.

EXAMPLE 7

Copolymerization is carried out under the conditions similar to those described in Example 1 hereinbefore, except that use is made of a 30% aqueous solution of acetic acid and prepared is a solution of the comonomers with the concentration of 30% in said acetic acid. The cationite yield is 100%. Swelling factor of the cationite in the H-form in water is 3.4. Swelling factor of the cationite in the H-form in a phosphate buffer (pH=6.8) is 4.5. Specific volume of the swollen cationite is 5.15 ml/g. Exchange capacity with respect to sodium ion is 10.3 mg.-equiv./g.

EXAMPLE 8

Into a flask provided with a stirrer, an inlet pipe for the supply of argon, and a dropping funnel, there are poured 437 ml of polyethylsiloxane liquid and argon is bubbled for 30 minutes. At the same time, in a current of argon, into the dropping funnel there are charged 14.4 g of acrylic acid, 2.6 g of hexahydro-1,3,5-triacryloyltriazine and 70 ml of a 20% acetic acid to give a solution of the comonomers in diluted acetic acid (concentration of the comonomers in the solution is 20%). After dissolution of the comonomers, charged into the dropping funnel in a current of argon is an initiator, i.e. 0.1305 g of ammonium persulphate and 0.1087 g of sodium metabisulphite. After dissolution of the initiator, the reaction mixture from the dropping funnel is poured out, as a thin stream, into the polyethylsiloxane liquid under stirring (i.e. the reaction mixture is dispersed in said liquid). Thereafter, copolymerization is carried out in suspension at a temperature of 20° C and under stirring for 5 hours, whereafter the stirring is discontinued and the copolymer suspension is maintained for an additional 10 hours at the same temperature. Then, the temperature in the flask is elevated to 80° C and the copolymer suspension is maintained at this temperature under stirring for 1 hour. After cooling to a temperature of 20° C, the cationite granules are separated from the polyethylsiloxane liquid and washed, in succession, with petroleum ether, acetone, water, a 0.5N aqueous solution of caustic soda, 1N aqueous solution of hydrochloric acid and water. The yield of cationite is 90%. The exchange capacity with respect to sodium ion is 10.1 mg.-equiv./g. Swelling factor of the cationite in the H-form in water is 5.8. Swelling factor in the H-form in a phosphate buffer (pH=6.8) is 9.0. Specific volume in the swollen state is 7.7 ml/g.

EXAMPLE 9

Into a flask provided with a stirrer, an inlet pipe for the supply of argon and a dropping funnel, there are charged 250 ml of polyethylsiloxane liquid and argon is bubbled thereinto for 30 minutes. At the same time, in a current of argon into the funnel there are charged 8.6 g of methacrylic acid, 0.81 g of N,N'-ethylenedimethacrylamide and 38 ml of a 15% acetic acid to give a solution of the comonomers in diluted acetic acid (concentration of the comonomers in the solution is 20%). After dissolution of the comonomers, into the funnel in a current of argon an initiator is added, i.e. 0.093 g of ammonium persulphate and 0.072 g of ascorbic acid. The solution of the comonomers and the initiator in a 15% acetic acid (the reaction mixture) is maintained in the dropping funnel at a temperature of 20° C for the period of 5 minutes. On expiration of this period the resulting pre-polymer is poured out into a thin stream into polyethylsiloxane liquid under stirring (i.e. the pre-polymer is dispersed in said liquid.) Thereafter, copolymerization is conducted in a suspension at a temperature of 20° C under stirring (r.p.m. number of the stirrer n = 200 to 300) for 5 hours and then at a temperature of 80° C under stirring for 2 hours. After cooling to a temperature of 20° C, the granules are washed, in succession, with petroleum ether, acetone, water, a 0.5N aqueous solution of caustic soda, a 1N aqueous solution of hydrochloric acid, water. The yield of the cationite is 98%. The granule size is 80 to 300 $\mu$. Swelling factor of the cationite in the H-form in water is 7.0 and in a phosphate buffer (pH=6.8) it is 11.3. Specific volume of the cationite in the swollen state is 9.2. ml/g. Exchange capacity with respect to sodium ion is 9.6 mg.-equiv./g. Sorption capacity with respect to L-asparaginase is 50 mg of protein per gram of the cationite.

EXAMPLE 10

Copolymerization is conducted under the conditions similar to those described in the foregoing Example 9, except that prepared is a solution of the comonomers in a 15% acetic acid with a concentration of 30%. The solution of the comonomers and initiator in a 15% acetic acid (i.e., the reaction mixture) is kept in the dropping funnel (prior to the supply of the solution into polyethylsiloxane liquid) at a temperature of 25° C for 1 minute. The cationite yield is 85%. Swelling factor of the cationite in the H-form in water is 4.0; that in a phosphate buffer (pH=6.8) is 6.2. Specific volume in the swollen state is 5.4 ml/g. Exchange capacity with respect to sodium ion is 9.4 mg.-equiv./g. Sorption capacity relative to terrilitine is 275 mg of protein per gram of the cationite. The yield of terrilitine upon desorption is 90%.

EXAMPLE 11

Copolymerization is conducted under the conditions similar to those of Example 9 hereinbefore, except that use is made of a 30% acetic acid as the solvent; N,N'-ethylenedimethacrylamide is taken in the amount of 3.46 g and prepared is a solution of the comonomers in a 30% acetic acid with a solution concentration of 15%. The cationite yield is 95%. Swelling factor of the cationite in the H-form in water is 3.8; that in a phosphate buffer (pH= 6.8) is 5.1. Specific volume in the swollen state is 8.8 ml/g. Exchange capacity relative to sodium ion is 7.8 mg.-equiv./g.

EXAMPLE 12

Copolymerization is conducted under the conditions similar to those described in the foregoing Example 9, except that use is made of a 30% acetic acid and N,N'- ethylenedimethacrylamide is taken in the amount of 1.17 g. The cationite yield is 94%. The swelling factor of the cationite in the H-form in water is 5.2; that in a phosphate buffer (pH = 6.8) is 8.2. Exchange capacity with respect to sodium ion is 9.6 mg.-equiv./g. Specific volume in the swollen state is 6.8 ml/g.

EXAMPLE 13

Into a flask provided with a stirrer, an inlet pipe for admission of argon, and a dropping funnel, there are poured 250 ml of polyethylsiloxane liquid and argon is then bubbled therethrough for 30 minutes. At the same time in a current of argon into the dropping funnel there are charged 6.8 g of methacrylic acid, 20 ml of a 30% acetic acid and 0.05 g of ammonium persulphate. The reaction mixture is maintained for 7 minutes at a temperature of 25° C, whereafter it is added with an additional 0.187 g of ammonium persulphate and 0.143 g of ascorbic acid. 2 minutes later, into the reaction mixture containing the resulting pre-polymer there is added 0.81 g of N,N'-ethylenedimethacrylamide dissolved in 18 ml of a 30% acetic acid. The reaction mixture is maintained for 1 additional minute at a temperature of 25° C, whereafter it is poured, in a thin stream, into the polyethylsiloxane liquid under stirring. Thereafter, copolymerization is conducted in suspension at a temperature of 25° C under stirring for 5 hours, then at a temperature of 80° C under stirring for 2 hours. After cooling to a temperature of 20° C, the cationite granules are separated from the polyethylsiloxane liquid and washed, in succession, with petroleum ether, acetone, water, a 0.5N aqueous solution of caustic soda, a 1N aqueous solution of hydrochloric acid, and with water. The cationite yield is 7.6 g (80%). The resulting granules have a size of from 50 to 200 $\mu$. Exchange capacity with respect to sodium ion is 10 mg.-equiv./g. Swelling factor of the cationite in the H-form in water is 7.2; that in a phosphate buffer (pH=6.8) is 16.0. Specific volume in the swollen state is 10.6 ml/g. Sorption capacity with respect to L-asparginase is 275 mg of protein per gram of the cationite.

EXAMPLE 14

Copolymerization is conducted under the same conditions as in the foregoing Example 9, except that use is made of 8.4 ml of methacrylic acid, 1.62 g of N,N'-ethylenedimethacrylamide, 37.4 ml of a 30% acetic acid, 0.2802 g of ammonium persulphate, 0.2151 g of ascorbic acid and 234 ml of polymethylphenylsiloxane liquid; r.p.m. of the stirrer is selected within the range of from 1,000 to 1,500. The cationite yield is 85%. Swelling factor of the cationite in the H-form in water is 7.5; that in a phosphate buffer (pH=6.8) is 13.8. The resulting granules have a size of from 5 to 50 $\mu$ with the predominant fraction of 5 to 20 $\mu$.

EXAMPLE 15

Copolymerization is conducted under the condtions similar to those described in Example 14 hereinbefore, except that use is made of a 15% acetic acid. The cationite yield is 75%. Swelling factor of the cationite in the H-form in water is 8.5; that in a phosphate buffer (pH=6.8) is 11.0. Size of the resulting cationite granules ranges from 10 to 100 $\mu$ with the predominant fraction with the size of from 20 to 50 $\mu$.

EXAMPLE 16

Copolymerization is conducted under the conditions similar to those described in the foregoing Example 13. The distinction resides in that use is made of 5 ml of methacrylic acid, 0.48 g of N,N'-methylenediacrylamide, 22 ml of a 5% acetic acid, 0.055 g of ammonium persulphate, 0.0427 g of ascorbic acid and 140 ml of polyethylsiloxane liquid. The cationite yield is 90%. Swelling factor of the cationite in the H-form in water is 5.8; that in a phosphate buffer (pH=6.8) is 9.0. Specific volume in the swollen state is 7.5 ml/g. Exchange capacity relative to sodium ion is 10.3 mg.-equiv./g.

EXAMPLE 17

Copolymerization is conducted under the conditions similar to those described in Example 13 hereinbefore. The distinction resides in that use is made of 5 ml of acrylic acid, 0.76 g of N,N'-ethylenedimethacrylamide, 24.3 ml of a 5% acetic acid, 0.01515 g of ammonium persulphate, 0.0117 g of ascorbic acid, and 150 ml of polyethylsiloxane liquid. The cationite yield is 95%. Swelling factor of the cationite in the H-form in water is 9.0; that in a phosphate buffer (pH=6.8) is 16.0. Specific volume of the cationite in its swollen state is 11.8 ml/g.

EXAMPLE 18

Copolymerization is conducted under the conditions similar to those described in the foregoing Example 13. The distinction resides in that use is made of 5.2 ml of methacrylic acid, 0.4 g of N,N'-hexamethylenedimethacrylamide, 0.0224 g of ammonium persulphate, 0.5 ml of a 0.1N aqueous solution of AgNO$_3$, 11 ml of a 30% acetic acid, and 100 ml of polyethylsiloxane liquid. The cationite yield is 5.5 g. Swelling factor of the cationite in the H-form in water is 4; that in a phosphate buffer (pH=6.8) is 8. Exchange capacity relative to sodium ion is 9.8 mg.-equiv./g.

EXAMPLE 19

Copolymerization is conducted under the conditions similar to those described in Example 1 hereinbefore, except that use is made of a 10% acetic acid and prepared is a solution of the comonomers in a 10% acetic acid with the 10% concentration of the comonomers. The cationite yield is 92%. Swelling factor in the H-form of the cationite in water is 7.9; that in a phosphate buffer (pH=6.8) is 12.1. Exchange capacity relative to sodium ion is 8.9 mg.-equiv./g. Specific volume in the swollen state is 10.8 ml/g.

EXAMPLE 20

Into a cylindrical flask provided with a plate-like stirrer, an inlet pipe for the supply of argon, and a dropping funnel, there are charged 225 ml of polyethylsiloxane liquid and argon is bubbled therethrough for 30 minutes. At the same time, in a current of argon, the dropping funnel is charged with 8.4 ml of methacrylic acid, 2.73 g of N,N'-ethylenedimethacrylamide, 49.3 ml of a 50% acetic acid, 0.1868 g of ammonium persulphate, 0.1437 g of ascorbic acid. The solution of the comonomers and initiator formed in the dropping funnel is dispersed in 308 ml of polyethylsiloxane liquid. Thereafter, copolymerization is conducted under stirring in a current of argon at a temperature of 20° C for 5 hours and at a temperature of 40° C for 2 hours. After cooling, the granules are successively washed with petroleum ether, acetone, water, a 0.5N aqueous solution of caustic soda, a 1N aqueous solution of hydrochloric acid, and with water, and then dried to give the 75% yield of the cationite. Swelling factor of the cationite in the H-form in water is 4.0; that in a phosphate buffer (pH=6.8) is 7.0. Specific volume in the swollen state is 5.35 ml/g. Exchange capacity relative to sodium ion is 8.1 mg.-equiv./g. Prevailing size of the cationite granules is 20-100 μ m.

EXAMPLE 21

Copolymerization is conducted under the conditions described in the foregoing Example 13. The distinction resides in that use is made of 5 ml of methacrylic acid, 0.395 g of N,N'-methylenediacrylamide, 22 ml of a 5% acetic acid, 0.0555 g of ammonium persulphate, 0.0427 g of ascorbic acid and 140 ml of polyethylsiloxane liquid. The cationite yield is 87%. Swelling factor of the cationite in the H-form in water is 4.3; that in a phosphate buffer (pH=6.8) is 8.0. Specific volume in the swollen state is 6.23 ml/g. Exchange capacity with respect to sodium ion is 10.1 mg.-equiv./g.

What is claimed is:

1. A process for producing carboxyl cationites comprising dissolution of an unsaturated carboxylic acid and a vinyl-containing amide as comonomers and an initiator of radical polymerization in a 5-50% acetic acid; as the unsaturated carboxylic acids use is made of compounds selected from the group consisting of methacrylic and acrylic acids; as the vinyl-containing amides use is made of compounds selected from the group consisting of hexahydro-1,3,5-triacryloyltriazine, N,N'-methylenediacrylamide, N,N'-ethylenedimethacrylamide and N,N'-hexamethylenedimethacrylamide; the unsaturated carboxylic acid and vinyl-containing amide are taken in a weight ratio of 3-12:1 at a concentration of said comonomers in a 5-50% acetic acid equal to 10-30%; the resulting reaction mixture is dispersed in a silicone liquid selected from the group consisting of polyethylsiloxane and polymethylphenylsiloxane liquids; weight ratio of said reaction mixture to said silicone liquid is 1:3-5 respectively; copolymerization is then effected in suspension at a temperature of from 20° to 100° C.

2. A process as claimed in claim 1, wherein the unsaturated carboxylic acid and vinyl-containing amide are taken in the weight ratio of 6-8:1 respectively.

3. A process as claimed in claim 1, wherein use is made of a 5-20% acetic acid with the concentration of the comonomers therein equal to 20%.

4. A process as claimed in claim 1, wherein, prior to dispersion, the reaction mixture is subjected to a prepolymerization at a temperature of from 20° to 25° C.

5. A process as claimed in claim 1, wherein as the initiator of radical polymerization use is made of redox system, viz. an ammonium persulphate - ascorbic acid redox system.

* * * * *